(No Model.)
A. MACY.
COFFEE OR TEA POT.
No. 589,005. Patented Aug. 31, 1897.
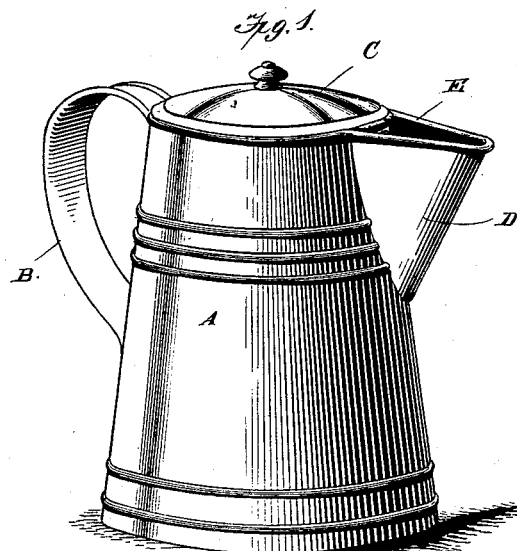
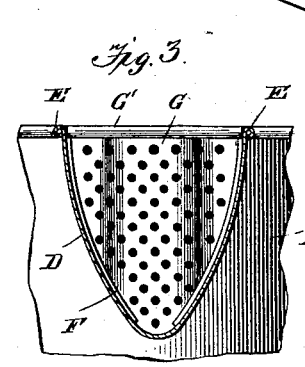
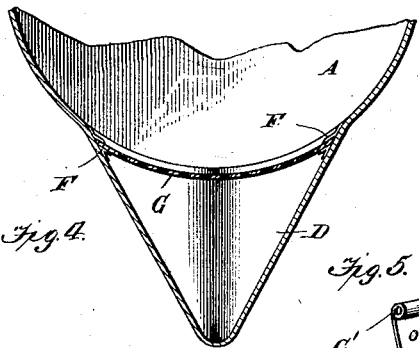
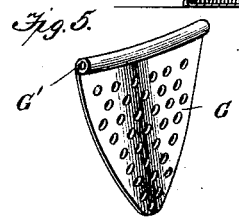
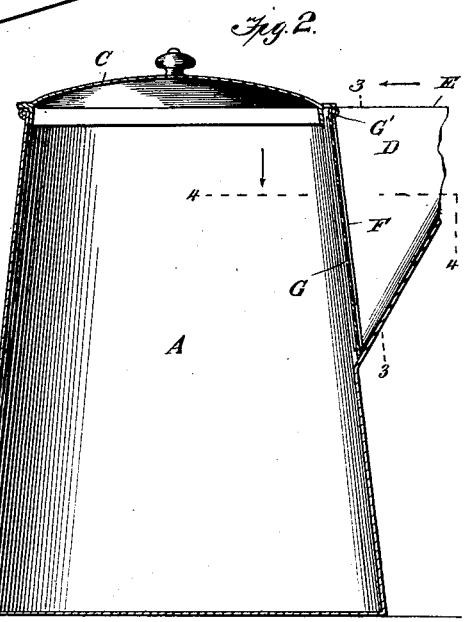
Witnesses
J. C. Shaw.
Chas. E. Brock.
Inventor
Amanda Macy,
by O'Meara & Co
Attorneys

UNITED STATES PATENT OFFICE.

AMANDA MACY, OF MACY, SOUTH DAKOTA.

COFFEE OR TEA POT.

SPECIFICATION forming part of Letters Patent No. 589,005, dated August 31, 1897.

Application filed November 23, 1896. Serial No. 613,219. (No model.)

*To all whom it may concern:*

Be it known that I, AMANDA MACY, residing at Macy, in the county of Butte and State of South Dakota, have invented a new and useful Coffee or Tea Pot, of which the following is a specification.

This invention relates generally to coffee and tea pots, and more particularly to the construction of the spout and strainer.

Heretofore the strainer has been provided by perforating the side of the pot proper inside of the spout, and the spout has been soldered to the pot upon the exterior in such a manner as to envelop the perforated strainer portion.

The operation of soldering the spout requires time and labor, and the strainer being formed integral with the pot cannot be readily cleansed when desired.

The object of my invention therefore is to cheapen the construction of the spout and provide a removable strainer which can be easily removed when desired for the purpose of cleaning the same.

With these various objects in view my invention consists, essentially, in forming the spout integral with the body of the pot; and the invention consists also in providing a removable strainer-plate and guideways arranged at the juncture of the spout and body of pot for the said strainer-plate to slide in.

The invention consists also in certain details of construction and novelties of combination, all of which will be fully described hereinafter and pointed out in the claim.

In the drawings forming a part of this specification, Figure 1 is a perspective view showing a coffee-pot constructed in accordance with my invention. Fig. 2 is a vertical sectional view, the end of the spout being broken off. Fig. 3 is a sectional view on the line 3 3 of Fig. 2. Fig. 4 is a sectional view on the line 4 4 of Fig. 2. Fig. 5 is a detail perspective view of the strainer-plate.

In carrying out my invention I employ a pot A, having a handle B and top C, constructed and arranged as usual. The spout D, however, is punched out integral with the body of the pot, as most clearly shown in Figs. 1 and 4, the upper edge of the spout and pot proper being beaded, as shown at E.

Where the spout joins the body of the pot I arrange the guideways F, in which the detachable strainer-plate G slides, the upper edge of which is beaded, as shown at G', so that when the strainer is slid into place the beaded edge will come into coincidence with the body edge of the pot and thereby provide an unbroken circle within which to fit the top of the flange.

The strainer-plate completely separates the pot and spout, and in pouring the coffee or tea from the pot it is clear that it must first pass through the strainer-plate, as usual.

The top bearing upon the body edge of the strainer-plate will securely hold the said plate in place, and whenever it is desired to remove the said strainer for the purpose of cleaning the same it is only necessary to slide the same upward, wash it, and replace it.

The construction and operation of my invention are exceedingly cheap and simple, and it will be seen that I provide a device which will efficiently perform all of the objects for which it is intended.

Having thus described my invention, what I claim as new, and desire to secure by Letters Patent, is—

The herein-described coffee or tea pot having the spout D punched out of the body of the pot, the upper edge of the spout and pot proper being beaded as at E, the guideways F, the detachable strainer-plate G slidable within said guideways, the upper edge thereof being beaded as at G', so that when the strainer is inserted into place the beaded edge will come into coincidence with the body edge of the pot, and thereby provide an unbroken circle within which the flange of the top is adapted to fit, substantially as shown and described.

AMANDA MACY.

Witnesses:
J. M. GARDNER,
MABEL GARDNER.